INVENTOR.
Lamont A. Cadmus
BY
Harness, Dickey & Pierce
ATTORNEYS

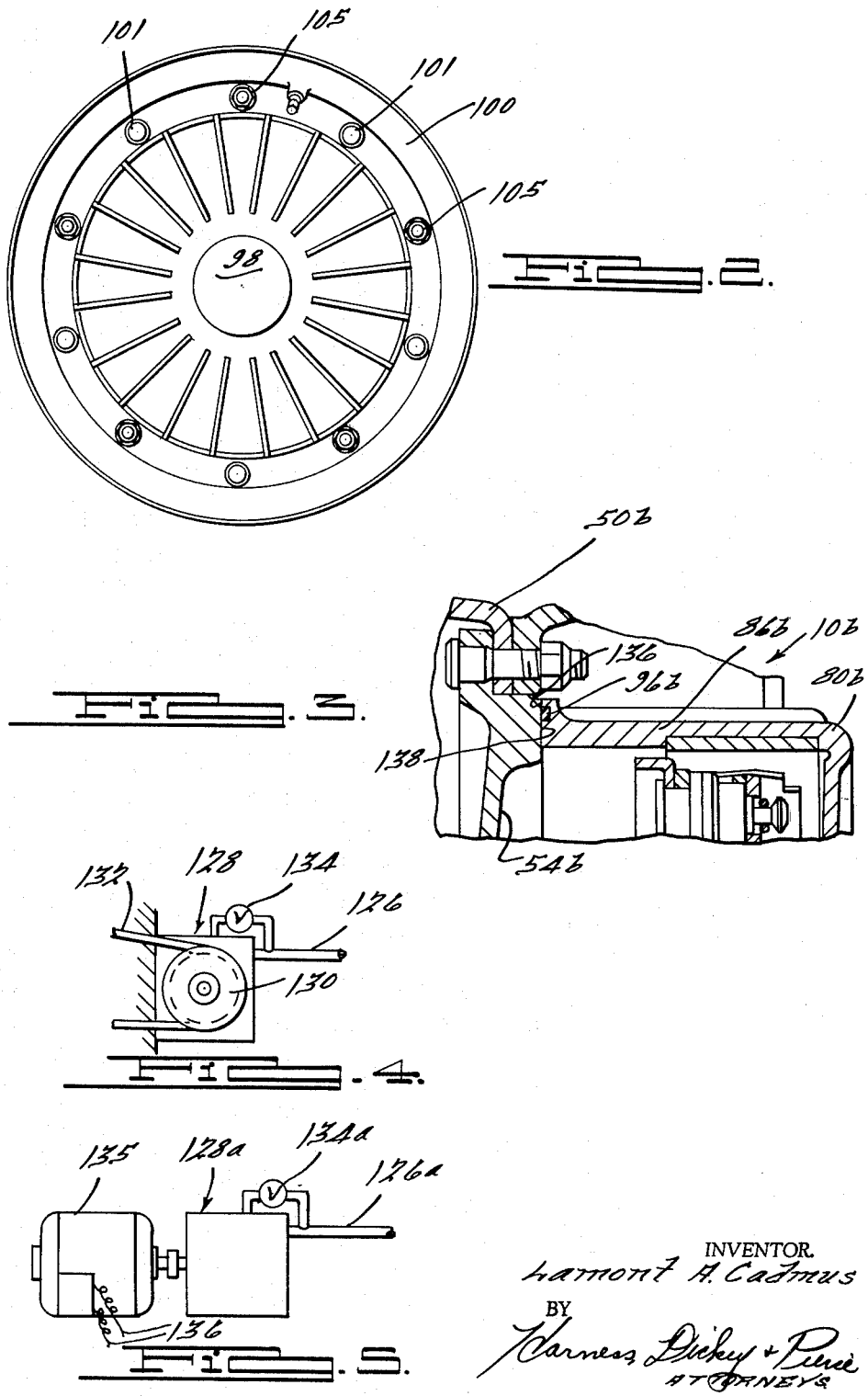

United States Patent Office 3,144,099
Patented Aug. 11, 1964

1

3,144,099
PRESSURIZED WHEEL AND BRAKE ASSEMBLY
Lamont A. Cadmus, Toledo, Ohio, assignor to Willys Motors, Inc., Toledo, Ohio, a corporation of Nevada
Filed Aug. 14, 1962, Ser. No. 216,840
2 Claims. (Cl. 188—2)

This invention relates generally to wheel and brake assemblies for motor vehicles and more particularly to a wheel and brake assembly and associated apparatus in which the brake members are disposed in a sealed and pressurized chamber.

It is desirable that the brakes for automotive vehicles be maintained dry and free from dirt; this can be extremely difficult where the vehicle is used in off-the-road applications as where a military vehicle is required to cross a stream, etc. Therefore, it is an object of this invention to provide a novel wheel and brake assembly and associated apparatus in which the brake components are disposed in a sealed chamber and are maintained dry and free from water, dirt, etc.

Where the brake components are disposed in a sealed chamber there is a tendency for a vacuum to be created therein such that water and/or dirt is drawn into the chamber through minute openings at the sealed surfaces. It is an object of this invention to provide a wheel and brake assembly in which the brake components are located in a sealed chamber which is maintained at a pressure higher than atmospheric pressure to thereby prevent water, dirt, etc., from being drawn into the sealed chamber.

In some instances it would be desirable that the pressure in the sealed chamber be maintained even though the engine of the vehicle is inoperative, e.g., the engine stalling while the vehicle is in the middle of a stream or the wheels are buried in sand or mud. Therefore, it is a further object to provide, for an automotive vehicle, a wheel and brake assembly having brake components disposed in a sealed chamber and apparatus for use therewith in which the pressure in the sealed chamber can be maintained higher than atmospheric pressure despite stalling of the engine of the vehicle.

Other objects, features, and advantages of the present invention will become apparent from the subsequent description and the appended claims, taken in conjunction with the accompanying drawings, in which:

FIGURE 2 is a side view of the outer side of the wheel and brake assembly of FIGURE 1;

FIGURE 3 is a fragmentary sectional view depicting a modified seal arrangement for the wheel and brake assembly of FIGURE 1;

FIGURE 4 is a view depicting apparatus for use with the wheel and brake assemblies of FIGURES 1 through 3; and FIGURE 5 is a view of different apparatus for use with the wheel and brake assemblies of FIGURES 1 through 3.

Figure 1:
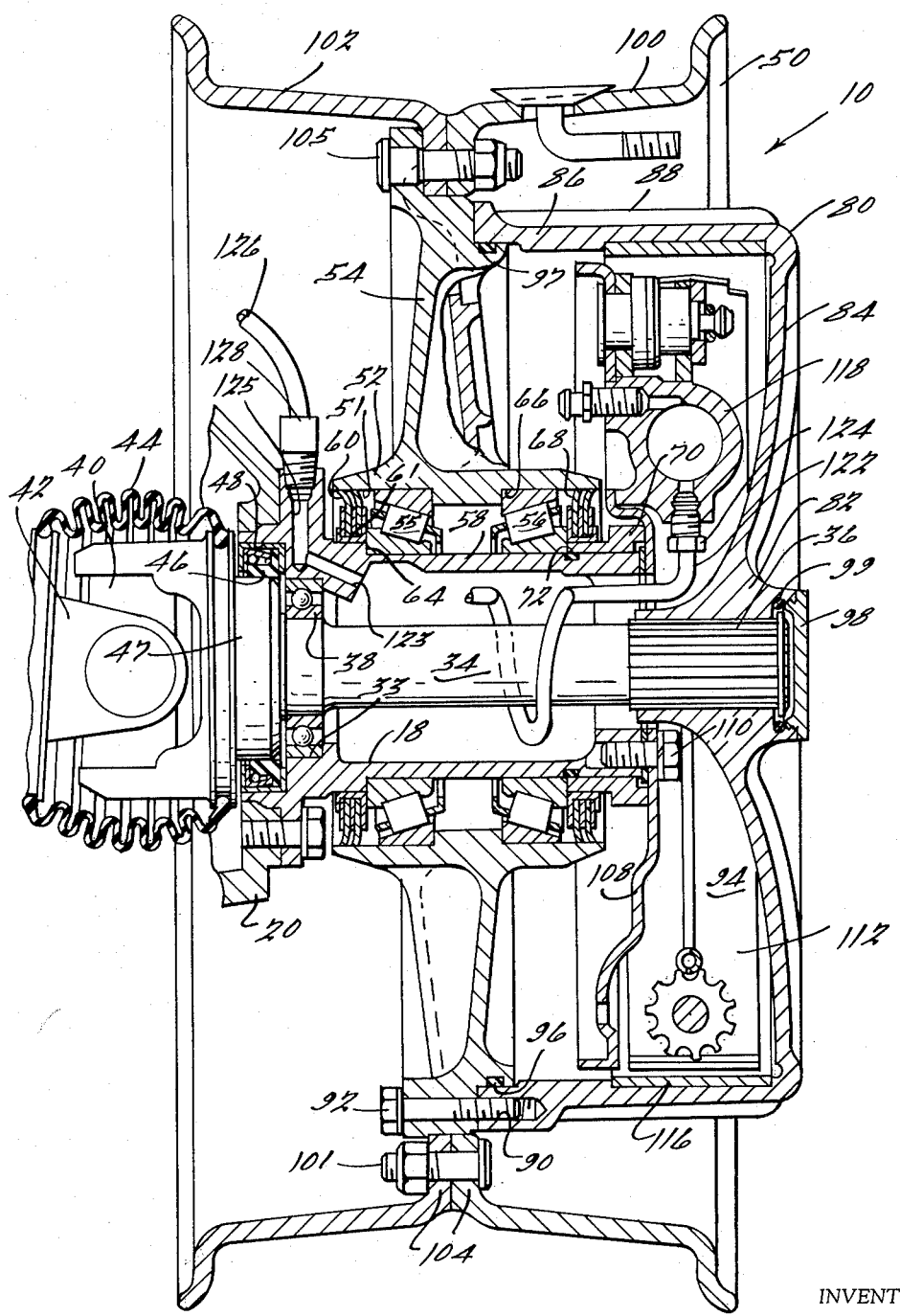
FIGURE 1 is a vertical sectional view of a wheel and brake assembly exemplifying features of the present invention.

Looking now to FIGURE 1, a wheel and brake assembly embodying features of this invention is generally indicated by the numeral 10 and is similar to the assembly shown and described in my U.S. Patent No. 3,028,932 and includes a tubular spindle housing 18 which extends axially outwardly transversely from the longitudinal axis of the vehicle (not shown) with which it is associated and is secured by means of a plurality of bolts to a bracket 20 which can be attached in a conventional manner to upper and lower control arms (not shown) ... (see U.S. Patent No. 3,028,932). While the wheel and brake assembly 10 is a powered and steerable wheel for use with four wheel drive vehicles, it should be understood that this invention is not restricted to use with that type of assembly.

2

A spindle 34 extends axially through the spindle housing 18, terminating at its outer end in a splined portion 36, and is supported intermediate its ends on a ball bearing 38 carried within a recess 33 in the spindle housing 18. The spindle 34 is connected at its inner end by a universal joint 40 secured to the outer end of a wheel drive shaft 42. The universal joint 40 is protected from dirt, water, etc., by a flexible boot 44 while the bearing 38 is protected from similar elements by an annular seal assembly 46 which is held in a cavity 48 in the inner end of spindle housing 18 at a position proximate the bearing 38; the inside diameter of the seal assembly 46 is in sealing contact with an enlarged diameter portion 47 of the drive spindle 34.

The assembly 10 also includes a wheel member 50 having a central hub 52 and an annular body portion 54 which extends radially outwardly from the hub 52. The hub 52 is supported for rotation about the spindle housing 18 by a pair of roller bearings 55 and 56 which are located in a pair of axially spaced cavities 51 and 66, respectively, in the hub 52. The bearings 55 and 56 are in turn supported on an intermediate portion 58 of the wheel spindle housing 18. In assembling the wheel hub 52 and the bearings 55 and 56 to the spindle portion 58, an annular seal unit 60 is first positioned about an enlarged diameter portion 61 located at the inner termination of the intermediate portion 58 and which defines therewith a shoulder 64 against which the inner race of the bearing 55 is axially moved. In this position, the radially outer surface of the annular seal 60 engages and provides a seal with the annular inner surface of the cavity 51. The bearing 56 is then mounted over the intermediate portion 58 and into the cavity 66. An annular retainer ring 70 is disposed upon the spindle housing 18 in engagement with the inner race of bearing 55 and extends about an O-ring 72 which is located within an annular groove in the surface of the intermediate portion 58 of the spindle housing 18. The sleeve 70 has a reduced diameter inner end portion which supports an annular seal 68, the radially outer surface of which engages the annular, inner surface of the cavity 66 to provide a seal therebetween.

A brake drum member 80 has a central hub 82 having an aperture which is splined for matable engagement with the splined portion 36 of the spindle 34. The brake drum member 80 also has a body portion 84 extending radially outwardly from the hub 82 which terminates in an axially inwardly extending, annular flange 86 which is formed on its outer surface with heat radiating fins 88. The axially inner edge of flange 86 is of a diameter to fit about an annular flange 97 on the wheel 50 and is provided with a plurality of threaded holes 90 which receive a similar plurality of bolts 92 which extend through the wheel 50 to thereby secure the drum 80 to the wheel 50. Looking to FIGURE 1 it can be seen that drum member 80 cooperates with the wheel body portion 54 and the spindle housing 18 to form an annular cavity or chamber 94 which extends about the spindle housing 18 and the spindle 34. This chamber is sealed by the seal assemblies 60 and 68 as previously described, and is further sealed by an O-ring 96 positioned between the drum flange 86 and the cooperating wheel flange 97; a cap 98, which is threadable into the outer end of the hub 82 such as to cover the splined end 36 of the spindle 34, is in turn in engagement with an O-ring seal 99 which seals the splined bore in the hub 82.

A plurality of bolts 105 connect a pair of annular wheel rim members 100 and 102, through radially inwardly extending flanges 104 to the wheel body portion 54 and are disposed alternately with bolts 101 which extend only through the flanges 104 to thereby hold the rim members 100, 102 together independently of bolts 105.

A radially outwardly extending brake backing plate 108 is secured by bolts 110 to the outer end of the spindle housing 18 within the chamber 94. A pair of brake shoes 112 (only one shown) are movably mounted on the backing plate 108 for radially outward movement into engagement with a liner 116 located peripherally internally on the drum rim 86 of the brake drum 80. The shoes 112 are moved outwardly in response to actuation of a hydraulic motor mechanism 118, of a conventional type, which is mounted on the backing plate 108 at a position between the upper ends of the brake shoes 112. The cooperation between the hydraulic motor mechanism 118 and the shoes 112 is of a conventional nature and is not described here in detail since those details are not the subject of the present invention. A bendable fluid supply line 122, formed of a substantially rigid metal or plastic material, extends through the spindle housing 18 and delivers fluid under pressure to the motor mechanism 118. The inner end of the line 122 can be connected to passageways (not shown, but similar to passageways 123 and 125 which serve a purpose to be presently seen) formed in the axially inner end of the spindle housing 18 and can be connected through a supply line (not shown) to a supply of fluid. A fitting 124 at the opposite end of the line 122 connects the line to the motor mechanism 118. As the supply of fluid is pressurized by the operator, the motor mechanism 118 is actuated, causing the shoes 112 to be moved into engagement with the drum liner 116 thereby retarding the movement of the brake drum 80. Intermediate it ends, the line 122 is formed in the shape of a loop which extends about the spindle 34 to thereby facilitate the connection of the ends of the line 122 without requiring strict tolerances on its overall axial length.

The pair of interconnecting passageways 123 and 125 extend through the axially inner portion of the spindle housing 18 and communicate with the chamber 94. A fluid line 126 has a fitting 128 at one end which is connected to the outer end of the passageway 125; the line 126 is connected at its other end to the output of an air compressor 128 (FIGURE 4) of a conventional construction, which is driven by means of a pulley 130 which can be interconnected to the accessory drive of the engine (not shown) of the vehicle by means of a belt 132. A regulator valve 134, of conventional construction, interconnects the output line 126 to the input side of the compressor 128 and is set to maintain the pressure in the line 126 at a predetermined value. Thus the pressure in the line 126 is communicated via the passageways 123 and 125 into the chamber 94 thus maintaining the chamber 94 at a selected pressure above the atmospheric or outside pressure. In the preferred embodiment the pressure in chamber 94 is maintained at 2–3 p.s.i. above atmospheric. The effect of this pressure within the chamber 94 is twofold; first, it eliminates the creation of a vacuum in the chamber 94 and the tendency for water, dirt, etc. to be drawn therein as a result of this differential in pressure with the outside, and secondly, a condition is maintained in which, in the event of a slight leak at any of the seals, air is moved from the inside of the chamber 94 to the atmosphere, thereby hindering or preventing the inward flow of water, dirt, etc. Note that the the seal assembly 68 is constructed such that the pressure in the chamber 94 augments its sealing effect relative to the cavity 66. In the embodiment as shown in FIGURE 4, the air compressor 128 is driven directly by the engine. In some instances, however, it may be desirable that pressure be maintained in the chamber 94 even though the engine of the vehicle is inoperative as in a stalled condition.

Looking now to FIGURE 5, a modification of the combination of FIGURE 4 is shown and like components are given like numbers with a subscript added. In the combination of FIGURE 5, the output fluid line 126a from the compressor 128a can be connected to the fluid line 126 of the assembly shown in FIGURE 1. A regulator valve 134a maintains the pressure in the line 126a at a desired level and the compressor 128a is driven by an electric motor 135 which is electrically connected to the battery (not shown) of the vehicle via a pair of lead wires 136. Thus, with the combination as shown in FIGURE 5 even if the engine of the vehicle stalls, the electric motor 135 will continue to drive the compressor 128a to maintain the pressure in the line 126a and hence maintain the pressure within the chamber 94.

In the use of the wheel and brake assembly 10, rotational power is supplied to the shaft 42 which rotates the spindle 34 which in turn rotates the brake drum 80. Since the brake drum 80 is secured to the wheel 50 by the bolts 92, the wheel is likewise rotated. Steering of the wheel 50 is accomplished through a conventional steering linkage (not shown) by means of the universal joint 40.

In FIGURE 3 is shown a modified construction of the wheel and brake assembly 10 of FIGURE 1 in which like components are given like numbers with the addition of a subscript. In the assembly 10b the brake drum 80b has its axially facing surface 136 at the end of flange 86b matably engaging an oppositely, axially facing surface 138 on the body portion 54b of wheel 50b; an O-ring 96b is located in an annular groove in the surface 136 of the flange 86b and is in sealing engagement with the annular mating surface 138 on the body portion 54b.

From the above description it can be seen that a wheel and brake assembly is provided in which the brake shoes 112 and the brake lining 116 of the brake drum 80 are located in the sealed chamber 94 and that means are provided whereby the sealed chamber 94 is pressurized to insure that water, dirt, etc. are kept out, thus providing that the brakes will be more effective under all conditions and that the brake components will have a longer life.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:
1. Apparatus for a motor vehicle comprising a wheel assembly including a nonrotatable spindle housing, a spindle member extending axially through said housing, a wheel member rotatably disposed on said spindle housing, a brake drum having an annular flange extending axially toward said wheel member and having a hub releasably connected to said spindle for rotation therewith, means connecting said brake drum to said wheel member to provide for rotation of said wheel member in response to rotation of said brake drum, said spindle housing having a fluid path extending therethrough in fluid communication with said chamber, said brake drum being of a shape to form with said wheel member and said spindle housing a closed annular chamber, sealing means for sealing said chamber disposed between pairs of a plurality of members comprising said wheel member, said spindle housing, said spindle and said brake drum,, said sealing means being of the type for maintaining a seal under pressure and including seal assembly means between said spindle housing and said wheel member for providing an increased sealing effect responsively to an increase in pressure in said chamber, said spindle housing having a fluid path extending therethrough in fluid communication with said chamber, braking means mounted on said spindle housing and extending into said chamber for selective engagement with said brake drum, and means permanently connected to said fluid path and being continuously in fluid communication with said chamber for maintaining said chamber under a pressure higher than atmospheric pressure, said braking means compris- ing an air compressor member for providing an output of air under pressure for said chamber and a pressure regulator member connected to said compressor for maintaining the pressure to said chamber substantially constant and at a sufficiently low magnitude whereby in the event of a slight leak of said sealing means air is moved from said chamber to the atmosphere through the slight leak thereby impeding the ingress of foreign matter into said chamber.

2. Apparatus for a motor vehicle having a source of electrical energy available independently from operation of the engine of the vehicle, said apparatus comprising a wheel assembly including a nonrotatable spindle housing, a spindle member extending axially through said housing, a wheel member rotatably disposed on said spindle housing, a brake drum having an annular flange extending axially toward said wheel member and having a hub releasably connected to said spindle for rotation therewith, means connecting said brake drum to said wheel member to provide for rotation of said wheel member in response to rotation of said brake drum, said spindle housing having a fluid path extending therethrough in fluid communication with said chamber, said brake drum being of a shape to form with said wheel member and said spindle housing a closed annular chamber, sealing means for sealing said chamber disposed between pairs of a plurality of members comprising said wheel member, said spindle housing, said spindle and said brake drum, said sealing means being of the type for maintaining a seal under pressure and including seal assembly means between said spindle housing and said wheel member for providing an increased sealing effect responsively to an increase in pressure in said chamber, said spindle housing having a fluid path extending therethrough in fluid communication with said chamber, braking means mounted on said spindle housing and extending into said chamber for selective engagement with said brake drum, and means permanently connected to said fluid path and being continuously in fluid communication with said chamber for maintaining said chamber under a pressure higher than atmospheric pressure, said braking means comprising an air compressor member for providing an output of air under pressure for said chamber, an electric motor member connected to the source of electrical energy for driving said compressor member whereby air under pressure can be provided to said chamber regardless of the operative condition of the engine of the vehicle and a pressure regulator member connected to said compressor for maintaining the pressure to said chamber substantially constant and at a sufficiently low magnitude whereby in the event of a slight leak of said sealing means air is moved from said chamber to the atmosphere through the slight leak thereby impeding the ingress of foreign matter into said chamber.

References Cited in the file of this patent

UNITED STATES PATENTS

| | | |
|---|---|---|
| 927,016 | Wisner | July 6, 1909 |
| 2,142,514 | Jones | Jan. 3, 1939 |
| 2,352,385 | Hollerith | June 27, 1944 |
| 2,418,194 | Piccardo | Apr. 1, 1947 |
| 2,762,458 | Geopfrich et al. | Sept. 11, 1956 |
| 2,862,733 | Reierson | Dec. 2, 1958 |
| 2,921,654 | Bradfield | Jan. 19, 1960 |
| 3,000,472 | Sturgis | Sept. 19, 1961 |
| 3,003,834 | Pendleton | Oct. 10, 1961 |
| 3,028,932 | Cadmus | Apr. 10, 1962 |

FOREIGN PATENTS

| | | |
|---|---|---|
| 459,703 | Canada | Sept. 13, 1949 |